March 29, 1927.
C. A. WULF
1,622,696
INLET VALVE FOR TOILET FLUSHING MECHANISM
Filed Aug. 20, 1925
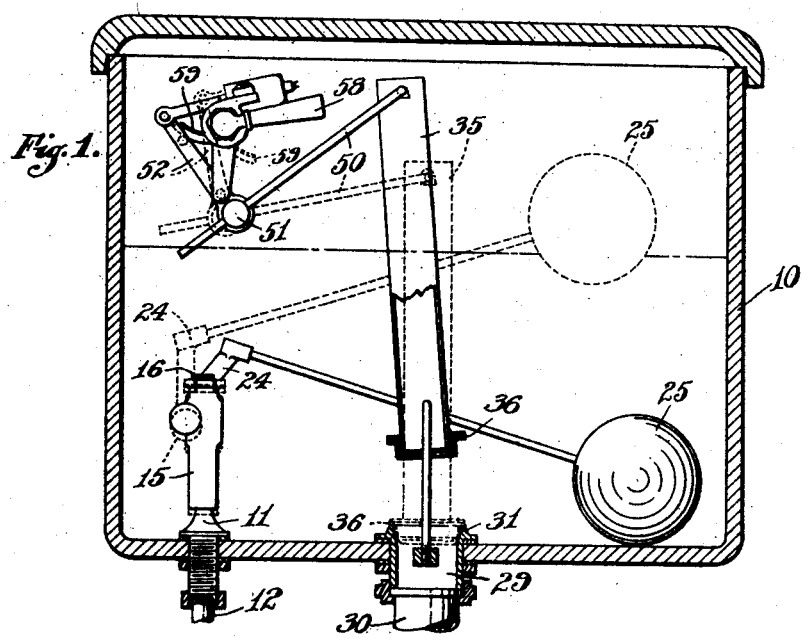
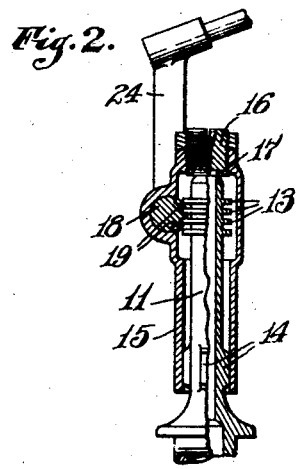
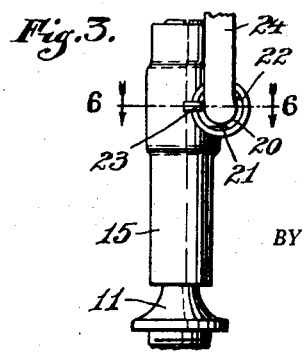
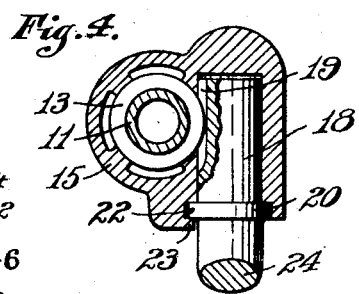
INVENTOR.
Charles A. Wulf,
BY
Hood & Hahn,
ATTORNEYS Patented Mar. 29, 1927.

1,622,696

UNITED STATES PATENT OFFICE.

CHARLES ARTHUR WULF, OF INDIANAPOLIS, INDIANA, ASSIGNOR TO AMERICAN VALVE AND ENAMELING CORPORATION, OF INDIANAPOLIS, INDIANA, A CORPORATION OF INDIANA.

INLET VALVE FOR TOILET-FLUSHING MECHANISM.

Application filed August 20, 1925. Serial No. 51,296.

The object of my invention is to produce a flushing apparatus for toilet bowls of simplified and efficient construction, said invention residing particularly in the structure of the inlet-valve of the water tank.

The accompanying drawings illustrate my invention.

Fig. 1 is an elevation in vertical section of a flushing tank with my valve installed therein.

Fig. 2 a vertical section of my improved float controlled inlet valve; Fig. 3 a side elevation of the parts shown in Fig. 2; and Fig. 4 a horizontal section, on an enlarged scale, on line 6—6 of Fig. 3.

In the drawings 10 indicates a tank having suitable storage capacity and provided with a water inlet nozzle 11 to which the water supply pipe 12 is attached in any desired manner.

The nozzle 11 projects upwardly into tank 10 and is provided, near its open upper end, with a series of circumferential flanges 13 spaced apart to form a cylindrical rack. Near its lower end nozzle 11 is provided with a series of circumferentially separated ribs 14 which form a guide for the lower end of a sleeve valve 15 which is telescoped over the end of nozzle 11 and provided at its upper end with a readily removable plug 16 pocketed in its lower end to receive a packing gasket 17 adapted to rest upon and close the upper end of nozzle 11.

Journaled in sleeve 15, at right angles to the main bore thereof, is a shaft 18 provided with teeth 19 meshing with annular rack 13. The shaft 18 may be removably held in place by any suitable means. In the drawings a simple and efficient retaining means is shown as a flange 20 carried by shaft 18 and notched at 21, said notch permitting the projection of flange 20 into a groove 22 behind a retaining finger 23 in a well-known manner.

The bore of sleeve 15 is enough larger than nozzle 11 and rack 13 to permit a free flow of water from nozzle 11, when the valve is opened, said flow, however being sufficiently restricted to eliminate noise.

Shaft 18 is provided with an arm 24 to which the usual float 25 is attached, the arrangement being such that, as the float descends the co-action between the teeth 19 of shaft 18 and the rack 13 will raise sleeve 15 so as to withdraw gasket 17 from the upper end of nozzle 11 and permit a filling flow, the construction operating, as the flow rises to gradually lower packing 17 on the upper end of the nozzle and to ultimately stop inflow.

The construction described above is such that inflow is practically noiseless. Furthermore due to the annular rack 13 the sleeve valve 15 and parts carried thereby is free to rotate on the nozzle 11 and thereby prevent binding of the float 25 against the side of the tank in event the stem becomes accidentally bent. By adjusting the plug 16 the quantity of water delivered may be regulated without bending or distorting the stem of the float 25.

The construction described above is also such as to be capable of production at a very low cost and the parts may be readily separated to permit renewal of the packing gasket 17.

Coacting with the outlet valve seat 31 is an outlet valve 36 carried at the lower end of a tube 35 which may be raised by an arm 50 carried by a rock shaft 51 operated by the action of a cam 59 on arm 52, the cam 59 being carried by a shaft controlled by handle 58.

I claim as my invention:

1. An inlet valve comprising a nozzle having a delivery orifice in its end, a valve sleeve telescoped thereover, the nozzle and sleeve being so formed as to produce a fluid passage between them, and the sleeve having a portion adapted to close the nozzle orifice, a toothed operating element journaled in the sleeve, and teeth carried by the nozzle and meshing with the operating element whereby the sleeve and nozzle may be relatively shifted axially to open and close the orifice.

2. An inlet valve comprising a nozzle having a delivery orifice in its end, a valve sleeve telescoped over said nozzle and having a closed end adapted to close the orifice, a series of teeth formed on the nozzle, and an operating shaft journaled in the sleeve and having teeth meshing with the teeth of the nozzle, whereby the sleeve may be axially shifted on the nozzle to open or close the orifice, the sleeve and nozzle being so formed as to produce a fluid passage between them.

In witness whereof, I have hereunto set my hand at Indianapolis, Indiana, this 12th day of August, A. D. one thousand nine hundred and twenty-five.

CHARLES ARTHUR WULF.